US008161889B2

(12) United States Patent
Morichika et al.

(10) Patent No.: US 8,161,889 B2
(45) Date of Patent: Apr. 24, 2012

(54) BOGIE STRUCTURE FOR A TRACK VEHICLE

(75) Inventors: Shunji Morichika, Hiroshima (JP);
Katsuaki Morita, Hiroshima (JP);
Hiroyuki Kono, Hiroshima (JP);
Hiroyuki Mochidome, Hiroshima (JP);
Hiroshi Yamashita, Hiroshima (JP);
Masahiro Yamaguchi, Mihara (JP);
Kosuke Katahira, Mihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 412 days.

(21) Appl. No.: 12/373,429

(22) PCT Filed: Nov. 16, 2006

(86) PCT No.: PCT/JP2006/323371
§ 371 (c)(1),
(2), (4) Date: Jan. 29, 2009

(87) PCT Pub. No.: WO2008/059604
PCT Pub. Date: May 22, 2008

(65) Prior Publication Data
US 2009/0288575 A1 Nov. 26, 2009

(51) Int. Cl.
*B61F 9/00* (2006.01)
(52) U.S. Cl. .................. 105/72.2; 105/215.2; 104/243; 104/245
(58) Field of Classification Search .............. 104/242, 104/243, 244, 245, 246, 247; 105/72.2, 215.1, 105/215.2
See application file for complete search history.

(56) References Cited

U.S. PATENT DOCUMENTS

| 3,180,280 | A | * | 4/1965 | Kuch et al. | 104/245 |
| 3,312,180 | A | * | 4/1967 | Mueller | 104/246 |
| 3,515,405 | A | * | 6/1970 | Segar | 104/246 |

(Continued)

FOREIGN PATENT DOCUMENTS
JP 51-60313 5/1976
(Continued)

OTHER PUBLICATIONS

Office Action issued on Jan. 3, 2011 in corresponding Korean Application No. 2009-7000855.

(Continued)

*Primary Examiner* — S. Joseph Morano
*Assistant Examiner* — Zachary Kuhfuss
(74) *Attorney, Agent, or Firm* — Kanesaka Berner and Partners, LLP

(57) ABSTRACT

The present invention provides the structure of a bogie for a vehicle in a track type transportation system in which the vehicle runs along a predetermined track, which can be simplified, and lightweight and which can be run at a high speed with the maintainability therefor being enhanced, comprising a guide rail 14 laid on the track 12, guide wheels 51 capable of traveling being made into contact with the guide rail 14, a guide arm 48 attached thereto with the guide wheels 51, and a guide wheel support bracket 52 for supporting the guide arm 48 arranged underneath an axle 22 of the vehicle so that the guide arm 48 is pivotable around a pivotal vertical support shat 56, left and right of the vehicle, and the guide arm 48, the guide wheels 51 and the guide wheel support bracket 52 constitute a unit structure which is attached to the axle 22 or a bogie frame 26 of the vehicle.

5 Claims, 7 Drawing Sheets

U.S. PATENT DOCUMENTS

| | | | |
|---|---|---|---|
| 3,853,069 A * | 12/1974 | Goodwin | 180/401 |
| 4,089,272 A * | 5/1978 | Schmitz | 104/247 |
| 4,232,611 A * | 11/1980 | Uozumi | 105/215.1 |
| 4,454,819 A | 6/1984 | Cuylits et al. | |
| 6,308,640 B1 | 10/2001 | Weule et al. | |
| 6,364,215 B1 | 4/2002 | Andre et al. | |
| 6,520,303 B1 | 2/2003 | Malek et al. | |
| 2009/0301342 A1 * | 12/2009 | Morichika et al. | 104/243 |

FOREIGN PATENT DOCUMENTS

| | | |
|---|---|---|
| JP | 57-125673 | 8/1982 |
| JP | 57-125673 U | 8/1982 |
| JP | 59-11955 | 1/1984 |
| JP | 59-139456 U | 9/1984 |
| JP | 1-27492 | 8/1989 |
| JP | 05097030 * | 4/1993 ............ 104/247 |
| JP | 5306404 | 11/1993 |
| JP | 09-315297 | 12/1997 |
| JP | 2002-019603 | 1/2002 |
| JP | 2006175962 | 7/2006 |
| JP | 2006205944 | 8/2006 |
| JP | 2006347425 | 12/2006 |
| WO | WO00/53480 | 9/2000 |

OTHER PUBLICATIONS

Singapore Search Report of Application No. 200900185-0 mailed Jan. 5, 2010.

Singapore Written Opinion of Application No. 200900185-0 dated Dec. 18, 2009.

* cited by examiner

US 8,161,889 B2

BOGIE STRUCTURE FOR A TRACK VEHICLE

CROSS-REFERENCE TO RELATED APPLICATIONS

The present application is based on International Application No. PCT/JP2006/323371, filed on Nov. 16, 2006, and priority is hereby claimed under 35 USC §119 based on this application. This application is hereby incorporated by reference in its entirety into the present application.

TECHNICAL FIELD

The present invention relates to a bogie structure for a track type vehicle which runs on a predetermined track by means of, for example, rubber tire type running wheels.

BACKGROUND ART

Different from a railway vehicle running on rails, a vehicle in a new transportation system in which a vehicle body runs being carried by rubber tires driven under rotation, is normally provided with steering guide wheels making contact with a guide rail laid along the track, for turning the rubber tires serving as running wheels, along a predetermined track, that is, the vehicle runs being mechanically steered.

As the guide rail, there have been presented the so-called side guide type and center guide type guide rails.

For example, as to the side guide type, Japanese Patent Laid-Open No. 59-11955 discloses a bogie for a guide rail type vehicle, having guide wheels which are attached to distal ends of guide beams projected from the opposite sides of a vehicle body and which are made to contact with guide rails so as to steer running wheels in association with the motion of the guide beams in leftward and rightward directions.

Explanation will be made of the structure of the bogie which is shown in FIGS. 2 and 3 in the above-mentioned document with reference to FIGS. 13 and 14 which show a portion of the bogie corresponding to one of axles.

An output power shaft of an electric motor which is not shown is coupled to a differential gear unit 012 carried by an axle body 010 and having an output power shaft which drives left and right running wheels 014, 014 of rubber tire type through the intermediary of an axle shaft and universal joints which are incorporated in the axle body 010 and which are not shown.

The running wheels 014 are supported respectively to opposite end parts of the axle body 010 by means of king pins 016 so as to be horizontally swingable, and the axle body 010 is bolted to a part of a mounting eye 020 provided to the lower surface of a frame 018, just inside of the king pins 016.

Further, suspension air springs 024 for vertical suspension are provided between the frame 018 and a bed frame 022 of the bogie 019.

Further, as shown in FIG. 14, upper rods 028 are attached between the frame 018 and brackets 026 which are secured to the bed frame 022, and lower rods 032 are attached between the brackets 026 attached to the bed frame 022 and brackets 030 which are secured to the axle body 010. Further, as shown in FIG. 13, a horizontal rod 036 is attached between a bracket 034 which is secured to the bed frame 022 and the frame 018. The upper rods 028, the lower rods 032 and the horizontal rod 036 serve as support rods in a suspension system.

Further, in a steering mechanism, guide wheels 042, 042 respectively attached to left and right end parts of a guide beam 040 which is extended left and right of the vehicle are rotated along left and right guide rails which are not shown, so as to be guided. Further, the displacement of the guide wheels 042, left and right of the vehicle, is transmitted to a guide wheel unit 046 composed of the guide beams 040 and the like, being guided by two rotating arms 044, 044, and then is transmitted to a steering arm 052 through the intermediary of steering rods 048, 050 so as to turn the left and right running wheels 014, 014 through the intermediary of a tie rod 054. Thus, the left and right wheels 014, 014 are steered in synchronization with each other, being guided along the left and right guide rails.

Further, Japanese Patent Laid-Open No. 09-315297 also discloses a bogie for a guide rail type vehicle having guide wheels which are attached to distal end parts of guide beams projected from the opposite sides of a vehicle body and which are made into contact with guide rails so as to steer the vehicle body in association with the left and right motions of the guide beams.

Further, as the center guide type, Japanese Patent Laid-Open No. 2002-019603 discloses the configuration that guide wheels are made into contact with a guide rail laid on a road surface so as to guide running of an automatic running vehicle when tires of the automatic running vehicle are laterally displaced exceeding an allowable limit of automatic steering.

However, the structure of the bogie of the side guide type track vehicle, as disclosed in the Japanese Patent Laid-Open No. 59-11955, requires extra components such as the guide beams 040 which are mounted at their both ends with the guide wheels 042, 042 and are extended left and right, and the two left and right arms 044 for pivotally supporting the guide beam 040, and further, the these components are heavy, resulting in an increase in the weight, and as well, are also bulky, resulting in a problem of occupation of a wide space. Further, during running, the guide wheels 042 make into contact with the guide rails, intermittently or continuously, with impacts, resulting in severe abrasion, and accordingly, the guide wheels 042, 042, the guide beam 040, the arms 044, 044 and the like require workings for periodical maintenance, and replacement of components. Further, since they are bulky and heavy, the maintainability thereof are problematic.

Thus, it has been desired to improve the structure of the bogie so as to be lightweight with excellent maintainability.

Further, the center guide type as disclosed in the Japanese Patent Laid-Open No. 2002-019603 only has a limited space between the lower part of the vehicle and the running surface, in which required mechanisms including guide wheels should be accommodated.

Thus, three has been desired the structure of the bogie that required mechanisms including the guide wheels can be accommodated in a narrow space between the lower part of the vehicle and the guide rails, incorporating a novel guide wheel mechanism which is lightweight with excellent maintainability.

Further, in addition, there have known as the prior art that guide wheels make contact with guide rails laid along a track so as to mechanically steer the vehicle on running, U.S. Pat. No. 6,520,303 (Patent Document 3), U.S. Pat. No. 6,364,215 (Patent Document 4) and WO00/53480 (Patent Document 5).

DISCLOSURE OF THE INVENTION

Thus, the present invention is devised in view of the above-mentioned background, and an object of the present invention is to provide a structure of a bogie for a vehicle in a track transportation system of the so-called center guide type with a new guide wheel mechanism, which includes guide wheels traveling along a guide rail laid on a track so as to allow the vehicle to run along a predetermined track path, and which can be simplified and is lightweight while it can run at a high speed with enhanced maintainability.

In order to achieve the above-mentioned object, according to the invention stated in claim 1, there is provided a structure of a bogie for a track type vehicle which runs along a predetermined track, comprising a guide rail laid on the track, guide wheels which are travelable along the guide rail, making contact with the guide rail, an arm member attached thereto with the guide wheels, a guide wheel support bracket for supporting the arm member underneath an axle of the vehicle, pivotally left and right of the vehicle, and a turn linking member for associating left and right wheels with a pivotal motion of the arm member, characterized in that the arm member and the guide wheels are mounted to the guide wheel support bracket so as to constitute a unit structure, and the guide wheel support bracket having the unit structure is mounted to the axle or a bogie frame of the vehicle.

With the configuration of the invention stated in claim 1, since the arm member attached thereto with the guide wheels is attached underneath the axle through the intermediary of the guide wheel support bracket, there can be materialized the structure that the guide wheels can be supported within a small space between the axle and the guide rail underneath the axle, and the structure can be simple and lightweight.

Further, since it is only necessary to attach the guide wheel support bracket attached thereto with the guide wheels and the arm member, to the axle or the bogie frame, substantially all components in the existing bogie of a side guide type, can be commonly used, except guide wheels, a guide beam and the like, without largely modifying the structure of the existing bogie.

Further, due to the unit structure among the arm members, the guide wheels and the guide wheel support bracket, it is possible to enhance the workability during maintenance such as periodical inspection or replacement of components, and further, the workability of assembling the bogie.

According to the invention stated in claim 2, there is provided a structure of a bogie for a track type vehicle as set forth in claim 1, characterized in that the arm member is formed being extended longitudinally of the vehicle, is mounted at its opposite end parts with the guide wheels and is attached at its center part to the guide wheel support bracket which is attached to the bogie frame with its arm member rotating and supporting part being arranged underneath a differential mechanism portion of the axle.

With the invention stated in claim 2, since the guide wheel support bracket is attached to the bogie frame, the structure of a bogie frame used in the existing bogie of a side guide type can be used without being largely modified, thereby it is possible to aim at commonly utilizing the structure of the bogie.

Further, due to the provision of the arm member rotating and supporting part underneath the differential mechanism portion of the axle, the arm member is located at the lowermost part of the structure of the bogie, and accordingly, the turning range of the arm member is prevented from being limited by another component or equipment.

According to the invention stated in claim 3, there is provided a structure of a bogie for a track type vehicle as set forth in claim 1, characterized in that the arm member is formed being extended longitudinally of the vehicle, is attached at its opposite ends with the guide wheels, and is mounted at its center part to the guide wheel support bracket which is mounted to an axle body portion of the axle with its arm member rotating and supporting part being located underneath the differential mechanism portion of the axle.

With the invention stated in claim 3, since the support bracket is mounted to the axle body portion of the axle, a bogie frame and the like used in the existing side guide type bogie can be used without being largely modified, thereby it is possible to aim at commonly using the structure of the bogie, and further since the support bracket can be mounted to the axle body portion of the axle having a high degree of rigidity, it is possible to ensure an attachment strength. Further, the support bracket can be small-sized and lightweight.

Further, since the arm member rotating and supporting part is arranged underneath the differential mechanism portion of the axle, the pivotal range of the arm member is prevented from being limited by another component or equipment, similar to the above-mentioned claim 2.

According to the invention stated in claim 4, there is provided a structure of a bogie as stated in claim 1, characterized in that the arm member is formed being extended longitudinally of the vehicle, is mounted at its opposite end parts with guide wheels, and is supported at its center part to the guide wheel support bracket which is attached to the bottom part of the differential mechanism portion of the axle with its arm member rotating and supporting part being located underneath the differential mechanism portion of the axle.

With the invention stated in claim 4, since the support bracket is attached to the bottom part of the differential mechanism portion of the axle, a structure of a bogie frame or the like used in the existing side guide type bogie can be used without being largely modified, and accordingly, it is possible to aim at commonly using the structure of the bogie, and since the support bracket is attached to the differential mechanism portion of the axle having a high degree of rigidity, it is possible to ensure an attachment strength. Further, the support bracket can be small-sized and lightweight.

Further, since the arm member rotating and supporting part is located underneath the differential mechanism portion of the axle, similar to the invention stated in claim 2, the rotating range of the arm member is prevented from being limited by another component or equipment.

According to the invention stated in claim 5, there is provided a structure of bogie for a track type vehicle as set forth in any one of claims 2 to 4, characterized in that the arm member rotating and supporting part is constituted so that arm member is supported by a pivotal support shaft which is supported to the support bracket in a cantilever-like manner.

With the invention stated in claim 5, since the pivotal support shaft constituting the arm member rotating and supporting part has a cantilever-like support structure, the structure can be simple, and lightweight.

According to the invention stated in claim 6, there is provided a structure of a bogie for a track type vehicle as set forth in any one of claims 2 to 4, characterized in that the arm member rotating and supporting part is constituted so that the arm member is supported by the pivotal support shaft which is supported to the support bracket in a both end supporting configuration.

With the invention stated in claim 6, since the pivot support shaft constituting the arm member rotating and supporting part has the both end supporting configuration, it is possible to ensure a supporting strength.

According to the present invention, there can be provided a structure of a bogie for a vehicle in a track type transportation system of the so-called center guide type in which guide wheels travel along a guide rail laid on a track so that the vehicle runs on a predetermined track path, which can be simple and lightweight, which can be driven at a high speed, and which can enhance the maintainability thereof.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR IMPLEMENTING THE INVENTION

Detailed and exemplified explanation will be hereinbelow made of preferred embodiments of the present invention with reference to the accompanying drawings. It is noted that dimensions, materials, shapes and relative arrangements of components, as stated in these embodiments, are mere examples for explanation, and should not be intended to limit the scope of the present invention unless otherwise specified.

Figure 1:
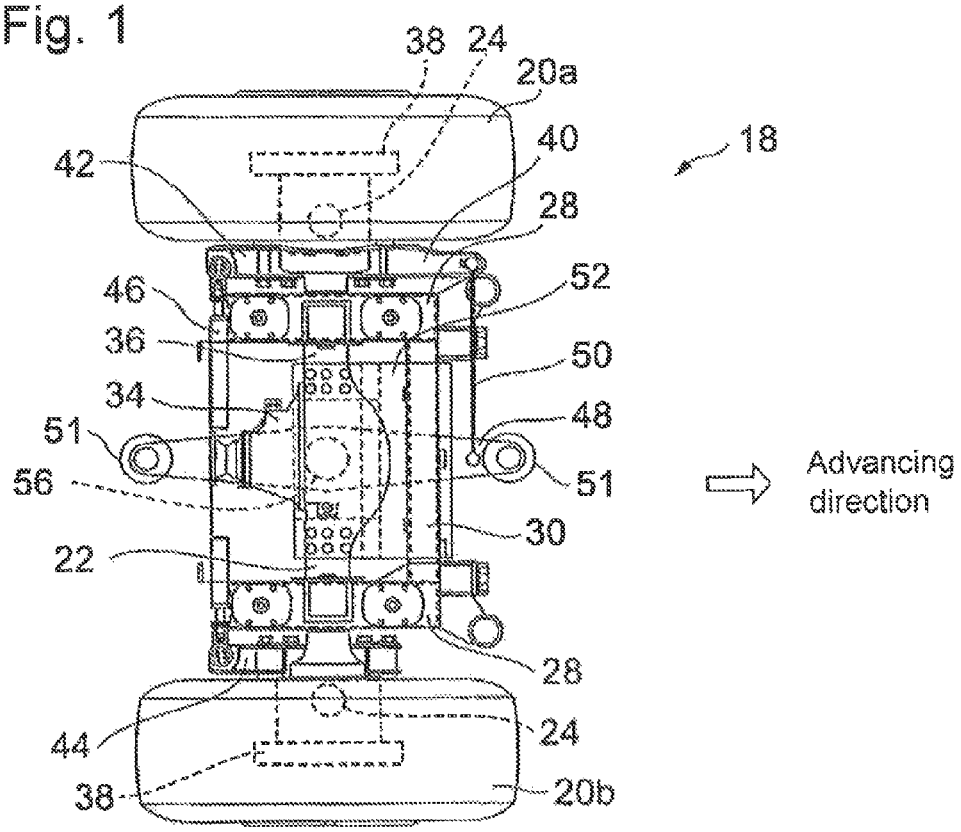
FIG. 1 is a plan view illustrating a structure of a bogie for a track type vehicle in a first embodiment of the invention.
Figure 2:
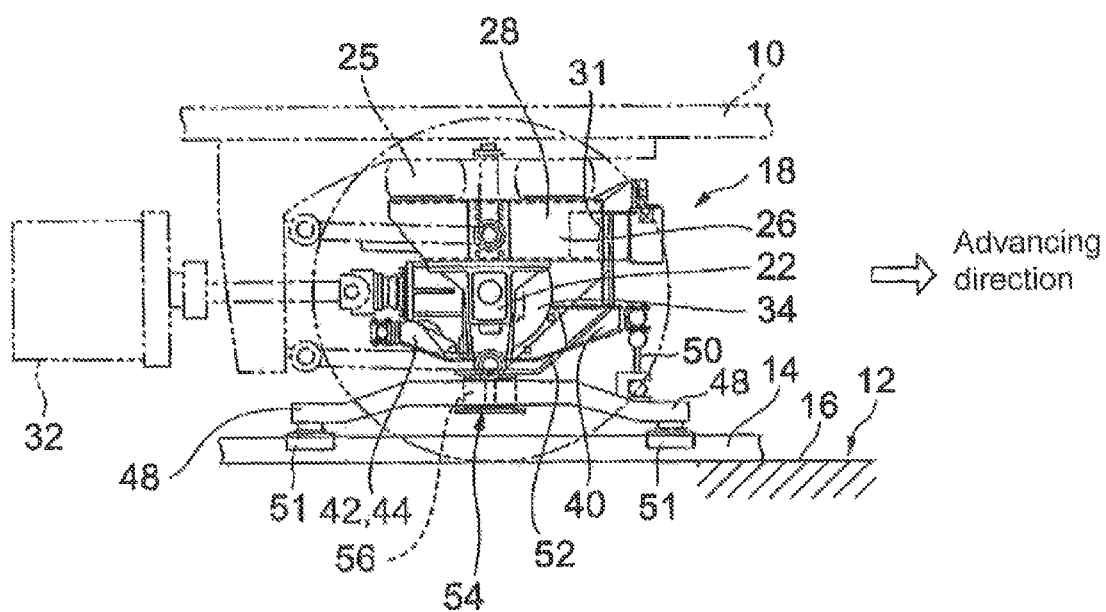
FIG. 2 is a side view illustrating the bogie in the first embodiment.
Figure 3:
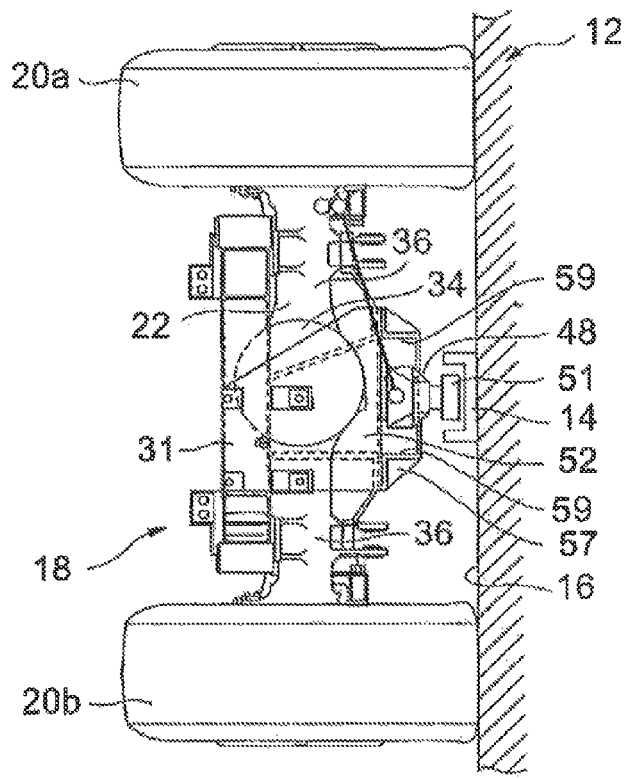
FIG. 3 is a front view illustrating the bogie in the first embodiment.
Figure 4:
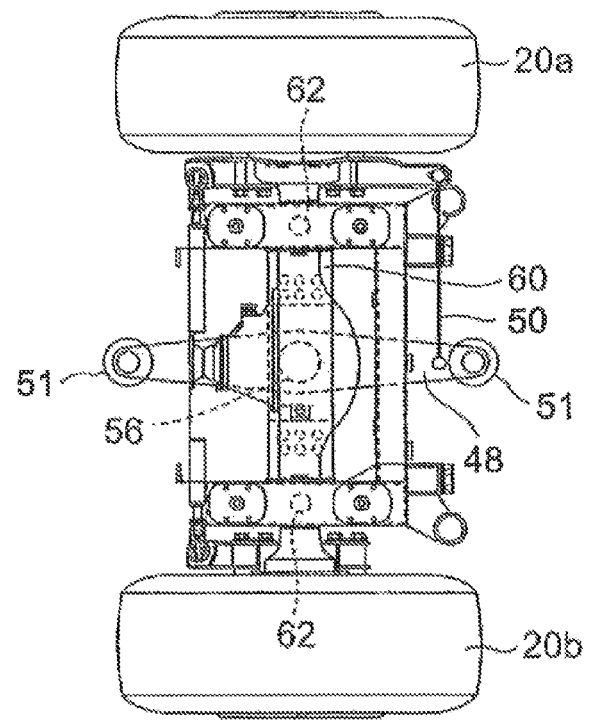
FIG. 4 is a side view illustrating structure of a bogie for a track type vehicle in a second embodiment of the present invention.
Figure 5:
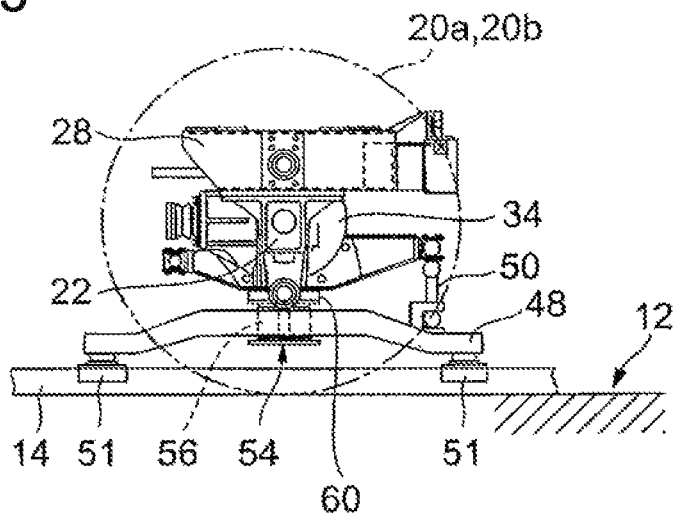
FIG. 5 is a side view illustrating the bogie in the second embodiment.
Figure 6:
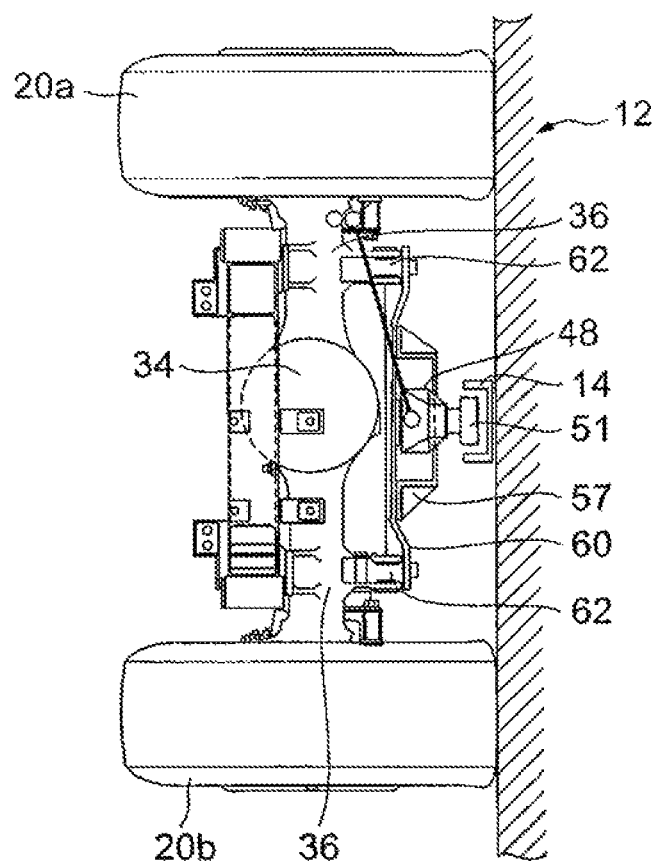
FIG. 6 is a front view illustrating the bogie in the second embodiment.
Figure 7:
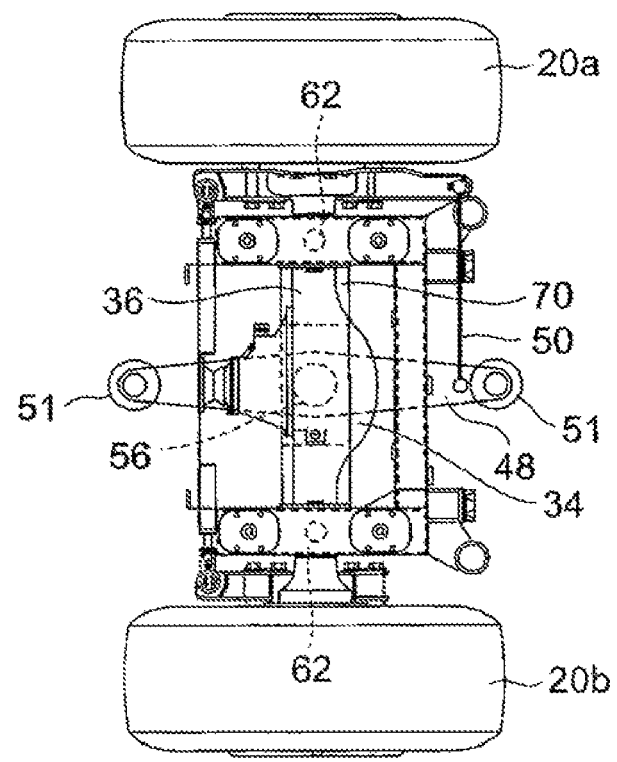
FIG. 7 is a plan view illustrating a structure of a bogie for a track type vehicle in a third embodiment of the present invention.
Figure 8:
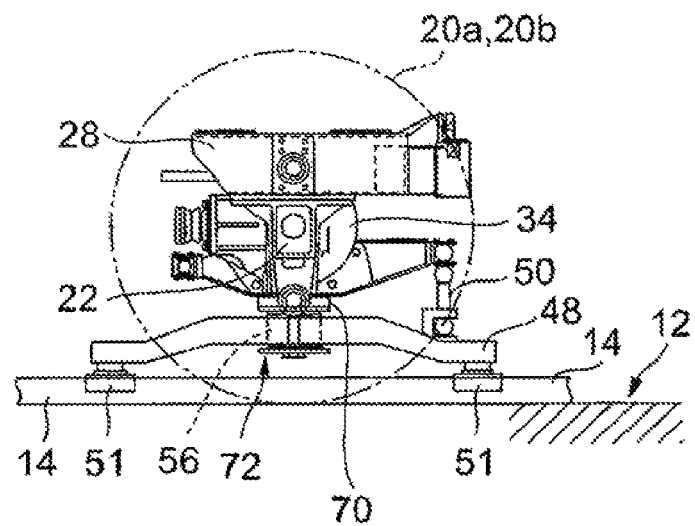
FIG. 8 is a side view illustrating the bogie in the third embodiment.
Figure 9:
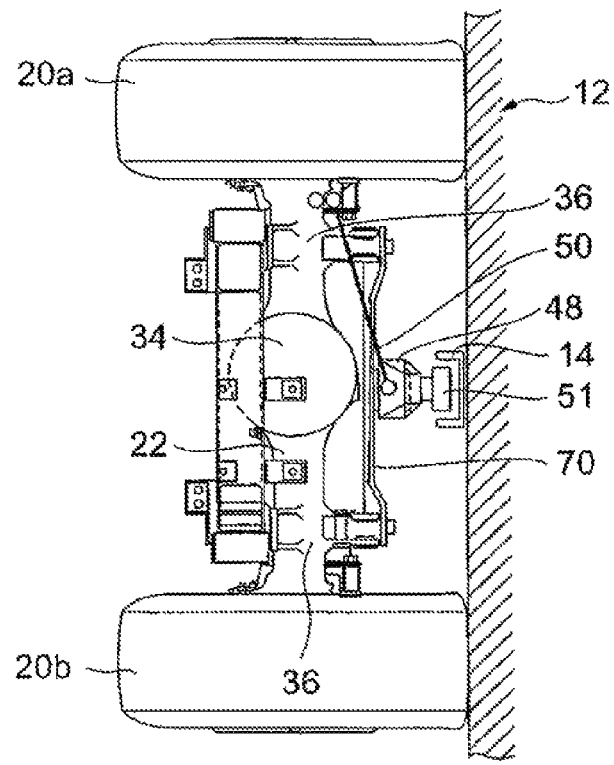
FIG. 9 is a front view illustrating the bogie in the third embodiment.
Figure 10:
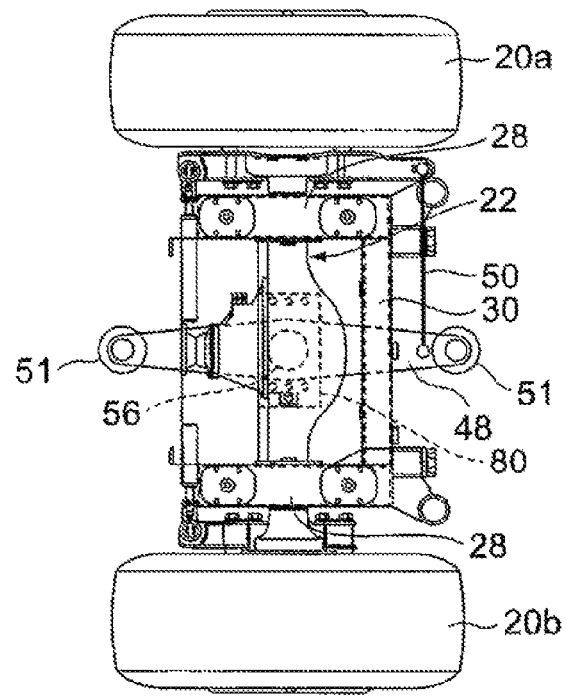
FIG. 10 is a plan view illustrating a structure of a bogie for a track type vehicle in a fourth embodiment of the present invention.
Figure 11:
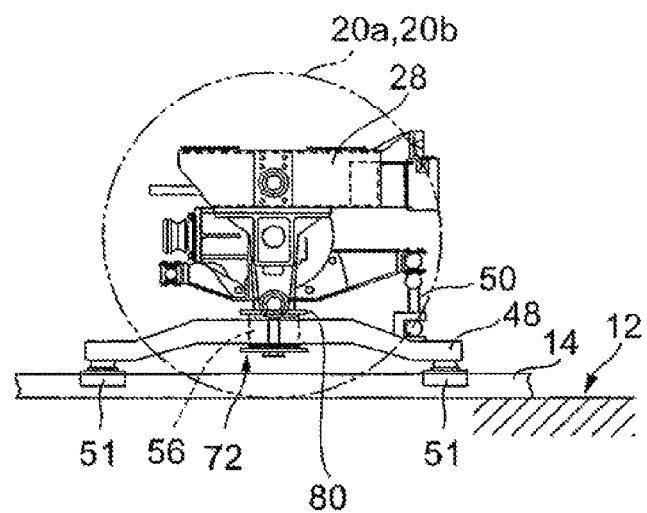
FIG. 11 is a side view illustrating the bogie in the fourth embodiment.
Figure 12:
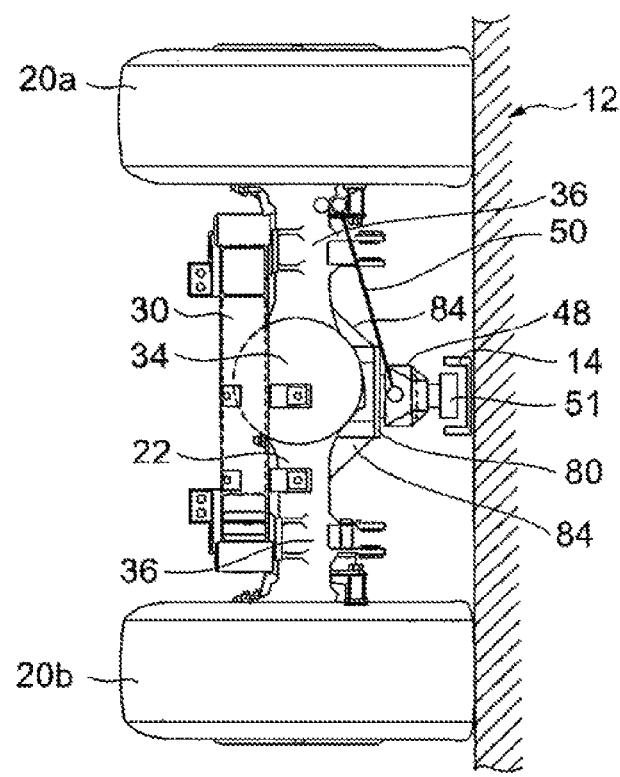
FIG. 12 is a front view illustrating the bogie in the fourth embodiment.
Figure 13:
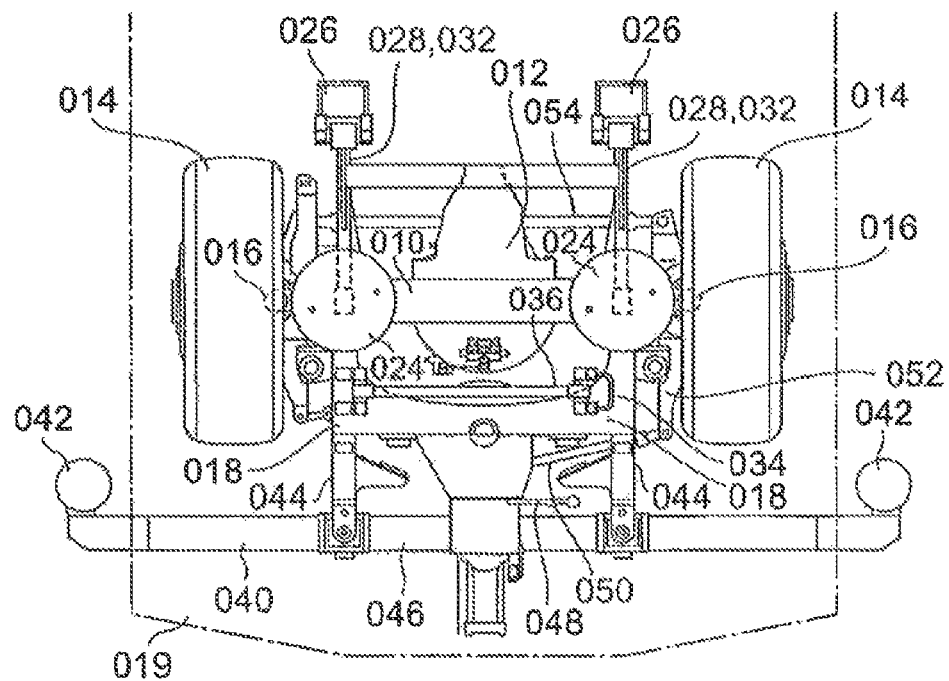
FIG. 13 is a plan view for explaining the prior art.
Figure 14:
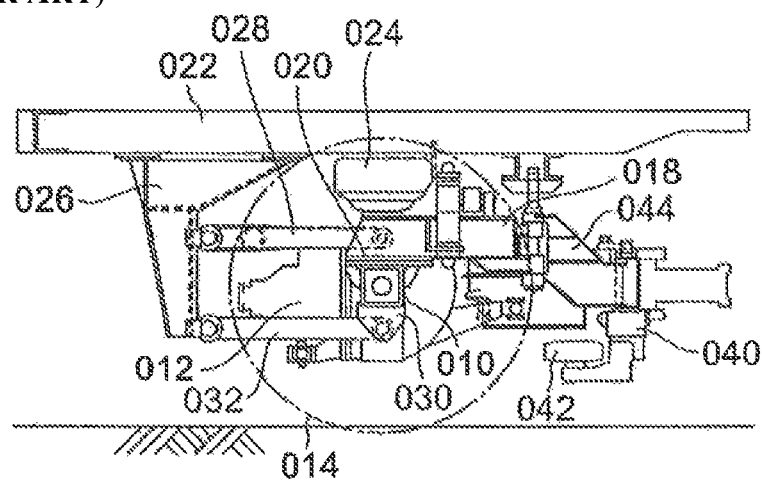
FIG. 14 is a side view for explaining the prior art.

AS to the drawings to be referred to, FIG. 1 is a plan view illustrating a structure of a bogie for a track type vehicle in a first embodiment of the present invention, and FIG. 2 is a side view, FIG. 3 is a front view. FIG. 4 is a plan view illustrating a structure of a bogie for a track type vehicle in a second embodiment of the present invention, FIG. 5 is a side view, and FIG. 6 is a front view. FIG. 7 is a plan view illustrating a structure of a bogie for a track type vehicle in a third embodiment of the present invention, FIG. 8 is a side view, and FIG. 9 is a front view. FIG. 10 is a plan view illustrating a structure of a bogie for a track type vehicle in a fourth embodiment of the present invention, FIG. 11 is a side view, and FIG. 12 is a front view. It is noted that like reference numerals are used to denote like parts to those explained in the prior art apparatus (FIGS. 13 and 14) so as to abbreviate the explanation thereto.

It is noted in the explanation of the embodiments, the direction of left and right is the one which is in the condition as viewed in the advancing direction of the vehicle within the vehicle.

First Embodiment

FIGS. 1 to 3 show a first embodiment of the present invention. A vehicle 10 used in a track type transportation system incorporates four wheels per vehicle, and runs along a track 12. A U-like cross-sectional shape guide rail 14 is laid in a substantially center zone of the track 12 in a groove-like manner with respect to a road surface 16. The U-like guide rail 14 is formed by laying a U-like steel bar on the road surface 6.

A bogie structure 18 shown in FIGS. 1 to 3, which is arranged in each of the front and rear portion of the vehicle 10, incorporates left and right front wheels 20a, 20b of a rubber tire type. The bogie structure on the front wheel side is similar to that on the rear wheel side, and accordingly, the bogie structure 18 which is located in the front part of the vehicle will be explained hereinbelow.

As shown in FIG. 1, the front left and right wheels 20a, 20b are mounted respectively to opposite end parts of an axle 22 which is extended left and right, by king pins 24, 24 so as to be horizontally swingable, and the axle 22 is integrally coupled to the lower surface of a bogie frame 26 having a closed sectional structure, being bolted thereto, just inside the king pins 24.

It is noted that the bogie frame 26 is composed of left and right side bogie frames 28, 28 extended longitudinally of the vehicle, and a center bogie frame 30 connecting the front end parts of left and right side bogie frames 28, 28 therebetween. Air springs 25, 25 are provided as suspension springs on the upper surfaces of the left and right side bogie frames 28, 28, as indicated by the chain lines, two for each, for supporting the vehicle 10 in a vibration isolating manner.

As to a drive unit, as indicated by the chain lines in FIG. 2, an output power shaft of an electric motor 32 is inputted into a differential mechanism portion 34 which is arranged in the center part of the axle 22, and the output power shaft of the differential mechanism portion 34 is adapted to drive the front wheels 20a, 20b through the intermediary of axle shafts and flexible joints which are incorporated in an axle body portion 36 and which are not shown.

Further, core type rubber tires which are not shown are worn on the front wheels 20a, 20b, and a foundation brake rigging 38 is incorporated in each of the front wheels 20a, 20b.

As shown in FIG. 1, a steering mechanism is provided therein with a steering arm 40 connected to the front left wheel 20a and extended forward, and a tie rod arm 42 extended rearward. Further, the front right wheel 20b is provided thereto with a tie rod arm 44 extended rearward. A tie rod 46 is laid spanning between the rear end parts of the left and right tie rods 42, 44. These tie rod arms 42, 44 and the tie rod 46 are pivotably coupled to one another by spherical surface joints.

Further, the front end part of the steering arm 40 is coupled to the front end part of a guide arm (arm member) 48 through the intermediary of a link rod (turn linking member) 50.

The guide arm 48 has at opposite end parts guide wheels 51, 51, and is attached to a guide wheel support bracket 52 located underneath the differential mechanism portion 34 and supported to the same, with the rotating center of the center part thereof being positioned on the center axial line of the axle 22. The guide wheel support bracket 52 is bolted at its upper end part to the side wall part 31 of the center bogie frame 30, is extended downward along the differential mechanism portion 34 and is bent therearound so as to extend thereunderneath, and incorporates, in its lower end part, an arm member rotating and supporting part 54 for pivotably supporting the guide arm 48 underneath the differential mechanism portion 34.

This arm member rotating and supporting part 54 constitutes a both end support configuration for the pivot support shaft 56 by bolting a protection frame 57 to the lower part of the guide wheel support bracket 52 therebelow so as to vertically hold therein the pivotal support shaft 56 which constitutes the rotating center of the guide arm 48 and which is vertically extended, in order to ensure a supporting strength for the pivotal support shaft 56. Further, the protection frame 57 is formed on its left and right side with vertical walls 59, 59 so as to have a function for limiting the turning range of the guide arm 48.

As stated above, the guide wheels 51, 51, the guide arm 48 and the guide wheel support bracket 52 are integrally incorporated with one another so as to constitute a unit structure in the condition that the guide wheels 51, 51 and the guide arm 48 are assembled to the guide wheel support bracket 52, and accordingly, they can be handled as one unit, thereby it is possible to attach and remove them to and from the bogie frame 26 as one unit.

Further, the guide arm 48 which is extended longitudinally of the vehicle so as to have a moderate chevron shape, is supported at its summit part to the guide wheel support bracket 52, and is attached at its opposite foot side ends with the guide wheels 51, 51. Further, it is coupled thereto with the link rod 50 in the vicinity of its front end part.

Moreover, it is desirable to use, as a material for the guide wheels 51, urethane rubber which is high vibration proof and wear-resistant or a material utilizing steel belts adapted to be used for rubber tires, or the like. The guide wheels 51 are usually set so as to have a predetermined gaps with respect the side walls of the guide rail 14 (which are about 0 to 100 mm)

When the front and rear guide wheels 51, 51 are guided, making contact with the guide rail 14, the guide arm 48 is turned left and right of the vehicle around the arm member rotating and supporting part 54 as a rotating center, and accordingly, the motion thereof is transmitted to the steering arm 40 through the intermediary of link rod 50, and is then transmitted to the right tie rod arm 44 through the intermediary of the left tie rod arm 42 and the tie rod 46. As a result, the front left and right wheels 20a, 20b are steered, in synchronization with each other, being guided along the guide rail 14.

Thus, with the use of a bogie structure in the first embodiment, since the guide arm 48 mounted thereto with the guide wheels 51, 51 is attached to the lower part of the differential mechanism portion 34 of the axle 22 through the intermediary of the guide wheel support bracket 52, there can be obtained the structure that the guide wheels 51, 51 can be supported within a slight space between the lower surface of the differential mechanism portion 34 and the guide rail 14, and further, since no extra components such as guide beams required for a conventional side guide type are required, the structure can be simplified and lightweight.

Further, since it is only required to attach the guide wheel support bracket 52 attached thereto with the guide wheels 51, 51 and the guide arm 48, to the center bogie frame 30 constituting the bogie frame 26, a bogie frame which has been used in the existing side guide type can directly used as it is without largely modifying the structure of the bogie frame 26 which is composed of the side bogie frames 28 and the center bogie frame 30, thereby it is possible to commonly use the bogie structure.

Further, due to the unit structure composed of the guide arm 48, the guide wheels 51, 51 and the guide wheel support bracket 52, it is possible to enhance the workability during maintenance such as periodical maintenance, replacement of components or the like, and as well enhance the workability during the assembly of the bogie.

Further, since the protection frame 57 attached to the guide wheel support bracket 52 can be removed underneath the vehicle, it is possible to facilitate the maintenance for the guide arm 48.

Further, since the arm member rotating and supporting part 54 is provided underneath the differential mechanism portion 34 of the axle 22, it can be arranged at the lowermost position of the bogie structure, thereby it is possible to prevent the turning range of the guide arm 48 from being limited by another component or equipment. Further, since it is arranged near the guide rail 14 and since the guide arm 48 has a moderate chevron shape, a twisting force or the like, other than a torque left and right of the vehicle, is exerted to the summit part of the guide arm 48, thereby it is possible to restrain the strength of the support portion from being detrimentally affected.

Second Embodiment

Next, explanation will be made of a second embodiment of the present invention with reference to FIGS. 4 to 6. The second embodiment will concerns a variant form of the guide wheel support bracket 52 in the first embodiment, and like reference numerals are used to denote like parts to those explained in the first embodiment so as to abbreviate the explanation thereto.

As shown in FIG. 5 which is a side view, similar to the first embodiment, the guide arm 48 which is located with its rotating center on the center axial line of the axle 22, is attached to the guide wheel support bracket 60 supported underneath the differential mechanism portion 34, and the guide wheel support bracket 60 is laid below the axle 22 along the direction of the axle, as shown in FIG. 6, and are attached, being bolted or welded, at its opposite ends to axle support seats 62, 62 provided in the axle body portion 36. Further, similar to the first embodiment, the structure of the arm member rotating and supporting part 54 has the both end support configuration that the protection frame 57 is bolted to the guide wheel support bracket 60 thereunderneath so as to hold the pivotal support shaft 56 up and down thereof, thereby it is possible to ensure a supporting strength.

With the second embodiment having the structure that the guide wheel support structure 60 is attached to the axle body portion 36 of the axle 22, structures such as the bogie frame used in the existing side guide type can be used without being largely modified, it is possible to commonly use the bogie structure. Further, since it is attached to the axle body portion 36 having a high degree of rigidity, the attaching strength can be ensured.

Further, the guide wheel support bracket 60 can be small-sized and lightweight, in comparison with the structure that it is attached to the bogie frame 26 as explained in the first embodiment.

Further, due to the unit structure among the guide arm 48, the guide wheels 51, 51 and the guide wheel support bracket 60, the guide wheel support bracket 60 can be easily removed and assembled below the vehicle.

Further, since the protection frame 57 can be removed below the vehicle, thereby it is possible to enhance the workability during maintenance such as periodical inspection for the guide arm 48 and the like, and replacement of components.

Third Embodiment

Next, explanation will be made of a third embodiment of the present invention with reference to FIGS. 7 to 9. The third embodiment will concern a variant form of the guide wheel support bracket 60 in the second embodiment, and like reference numerals are used to denote like parts to those explained the second embodiment so as to abbreviate the explanation thereto.

Referring to FIG. 8 which is a side view and FIG. 9 which is a front view, the structure of an arm rotating and supporting part 72 incorporated in a guide wheel support bracket 70 has not the both end support configuration but has a cantilever configuration. That is, the pivotal support shaft 56 is not supported up and down, but is supported only by the guide wheel support bracket 70 in the cantilever configuration using a component corresponding to the protection frame 57 explained in the second embodiment.

With this third embodiment, the pivot support shaft 56 can be supported without using a component corresponding to the protection frame 57 in the second embodiment, and accordingly, the structure can be simplified and be lightweight.

Fourth Embodiment

Next, explanation will be made of a fourth embodiment with reference to FIGS. 10 to 12. The fourth embodiment of the present invention will concern a variant form of the guide wheel support bracket 70 in the third embodiment, and like reference numerals are used to denote like parts to those explained in the third embodiment so as to abbreviate the explanation thereto.

Referring to FIG. 11 which is a side view and FIG. 12 which is a front view, a guide wheel support bracket 80 is attached to the lower surface of the differential mechanism portion 34 of the axle 22. Mounting eyes 84, 84 thereof may be coupled to the hosing of the differential mechanism portion 34 by welding or has been preferably integrally incorporated with the housing during manufacture of the housing by casting.

With this fourth embodiment, the guide wheel support bracket 70 which is laid along the axle 22 as explained the third embodiment, can be further simplified, small-sized and lightweight.

In view of the above-mentioned embodiments, although explanation has been made of such that the guide wheels 51, 51 are made into contact with the guide rail 14 so as to steer the vehicle along the guide rail 14, as to a track transportation system in which a vehicle on running is automatically steered in accordance with steering data which has been previously determined, there may be of course used a bogie similar to those explained above as safety measures in the case of a steering mechanism for automatically steering the vehicle on running fails and so forth. That is, the guide wheels explained in the above-mentioned embodiments can be used so as to serve as protection guide wheels having a fail-safe function in order to guide the vehicle along the guide rail. That is, the bogie can be applied in both kinds of vehicles which are even though different from each other in view of whether the bogie is used for a vehicle steered always by the guide wheel or only upon an emergency.

According to the present invention, in the track type transportation system in which the vehicle runs on a predetermined track path by causing the guide wheels to travel along the guide rail laid on the surface of the track, the structure of the bogie can be simplified and be light weight, and the vehicle can be driven at a high speed.

Further, it is possible to enhance the maintainability, and accordingly, the bogie can be advantageously applied in the vehicle in the track type transportation system.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A bogie structure for a track type vehicle which runs along a predetermined track, said bogie structure comprising:
   a guide rail laid along the track,
   guide wheels making contact with the guide rail so as to travel along the guide rail,
   an arm member attached to the guide rail with the guide wheels,
   a guide wheel support bracket supporting the arm member underneath an axle of the vehicle so that the arm member is turnable left and right of the vehicle, and
   a turn linking member for linking the turning motion of the arm member to left and right wheels,
   wherein
   the arm member and the guide wheels are attached to the guide wheel support bracket so as to constitute a unit structure,
   the guide wheel support bracket having the unit structure is mounted to the axle or a bogie frame of the vehicle,
   the arm member has a center part and opposite end parts,
   the arm member extends longitudinally relative to the vehicle,
   the arm member is mounted at the opposite end parts with the guide wheels,
   the center part is supported to the guide wheel support bracket which is attached to the bogie frame with an arm member rotating and supporting part thereof being located underneath a differential mechanism portion of the axle of the vehicle,
   the arm member rotating and supporting part is constituted so that the arm member is attached by a pivotal support shaft which is attached to the guide wheel support bracket in a both end supporting configuration, and
   said pivotal support shaft is vertically held in a both end supporting configuration by the guide wheel support bracket and a protection frame attached to the lower part of the guide wheel support bracket.

2. The bogie structure for a track type vehicle as set forth in claim 1, wherein
   the arm member has two ends that are attached to said guide wheels respectively, and
   the arm member is turnable left and right of the vehicle around a center part of the arm member positioned on a center axle line of the axle as a rotating center.

3. The bogie structure for a track type vehicle as set forth in claim 1, further comprising a link rod and a tie rod for linking the turning motion of the arm member to the left and right wheels, wherein said turn linking member is located underneath the axle.

4. The bogie structure for a track type vehicle as set for in claim 1, the protection frame comprises vertical walls on left and right sides of the protection frame such that a guide arm is placed between the vertical walls, thereby limiting the turning range of the guide arm.

5. The bogie structure for a track type vehicle as set for in claim 3, further comprising left and right tie rod arms, wherein the tie rod is arranged spanning between rear end parts of the left and right tie rod arms, and the tie rod arms and the tie rod are pivotably coupled to one another.

* * * * *